Dec. 28, 1965
D. F. BOWMAN
3,226,658
PLURAL INDEPENDENT CHANNEL CONCENTRIC ROTARY COUPLER
Filed Oct. 3, 1960
8 Sheets-Sheet 1
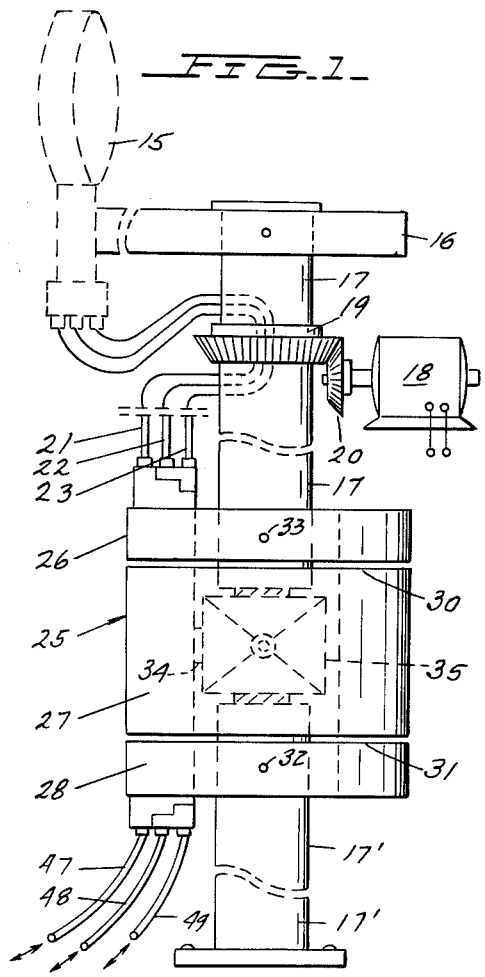
FIG.1
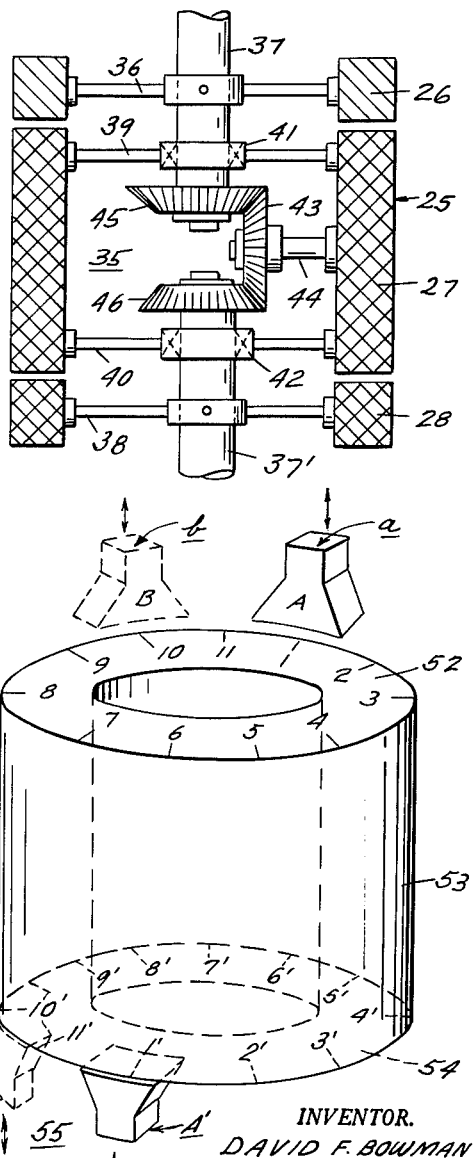
FIG.2
FIG.3
INVENTOR.
DAVID F. BOWMAN
BY
OSTROLENK, FABER, GERB & SOFFEN
ATTORNEYS Dec. 28, 1965 D. F. BOWMAN 3,226,658
PLURAL INDEPENDENT CHANNEL CONCENTRIC ROTARY COUPLER
Filed Oct. 3, 1960
8 Sheets-Sheet 2
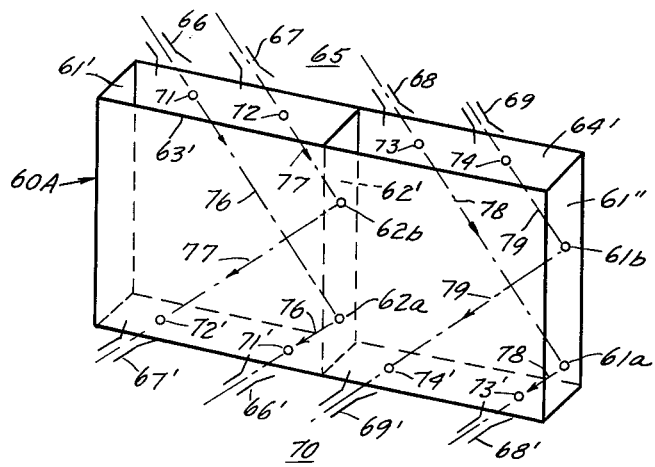
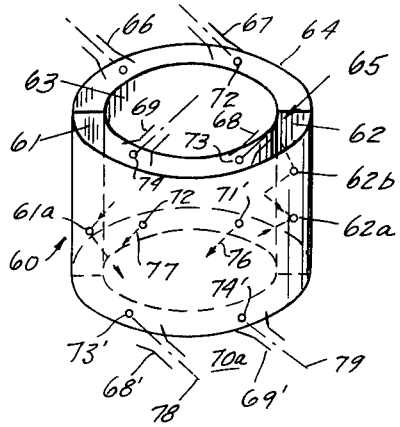
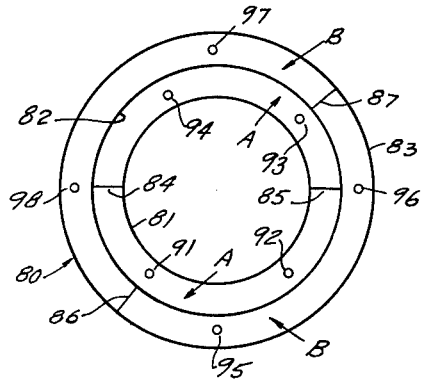
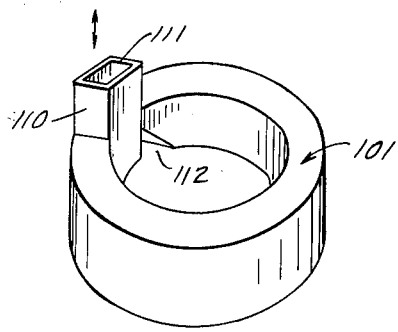
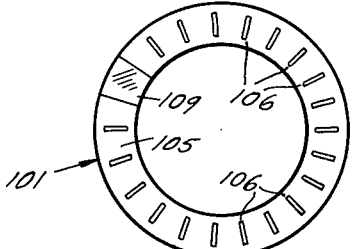
INVENTOR.
DAVID F. BOWMAN
BY
OSTROLENK, FABER, GERB & SOFFEN
ATTORNEYS

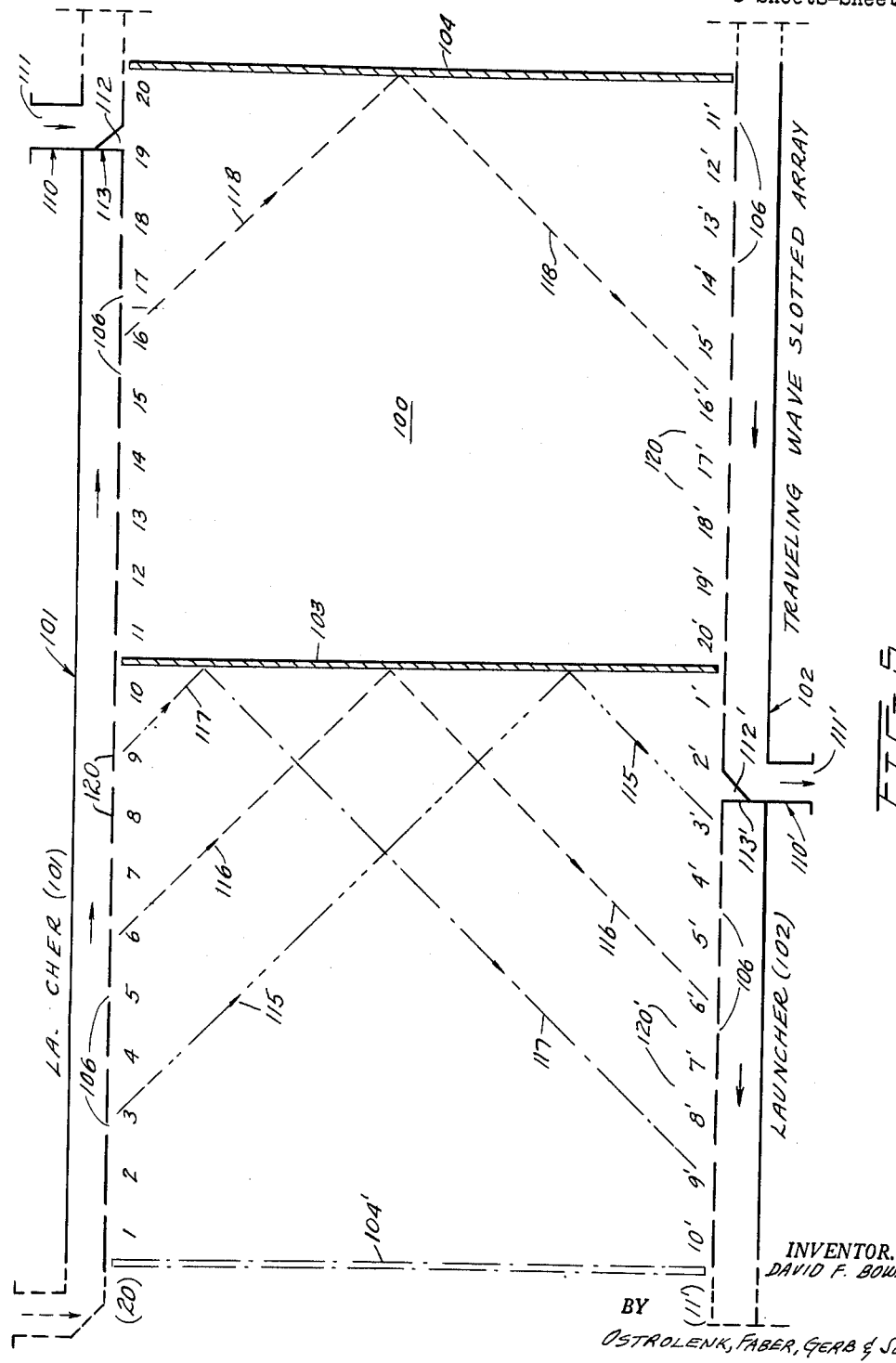

Dec. 28, 1965          D. F. BOWMAN          3,226,658
PLURAL INDEPENDENT CHANNEL CONCENTRIC ROTARY COUPLER
Filed Oct. 3, 1960          8 Sheets-Sheet 4
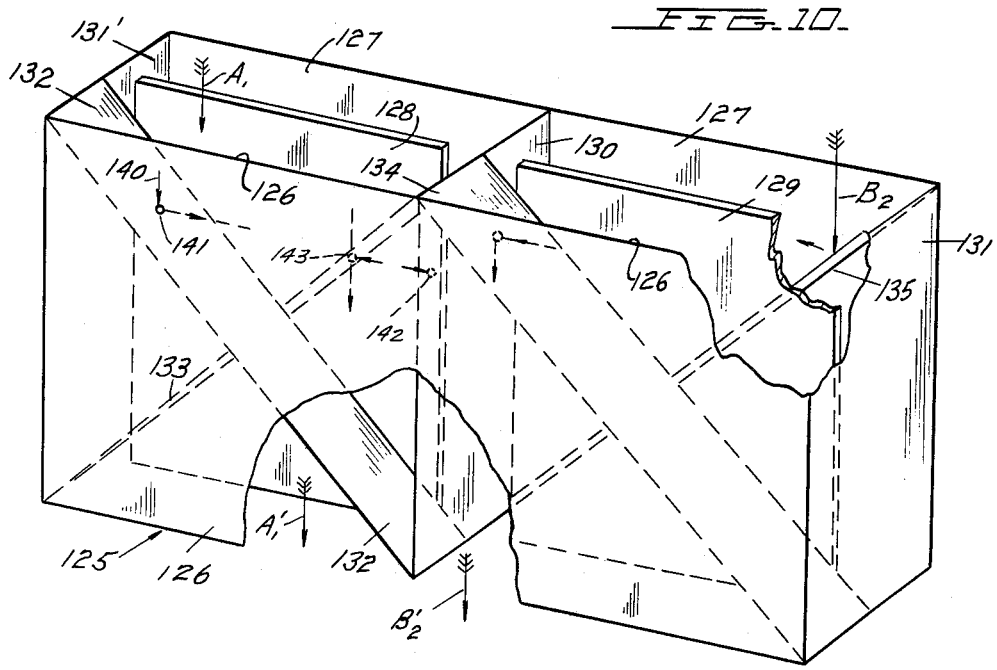
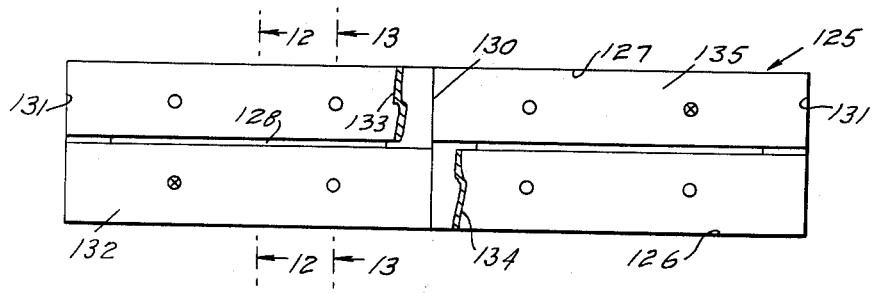
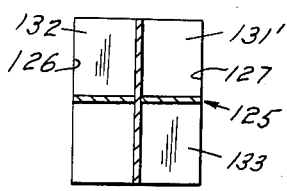 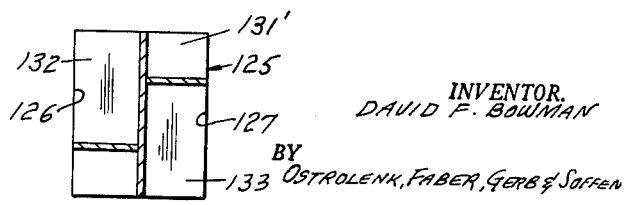
INVENTOR.
DAVID F. BOWMAN
BY OSTROLENK, FABER, GERB & SOFFEN
ATTORNEYS

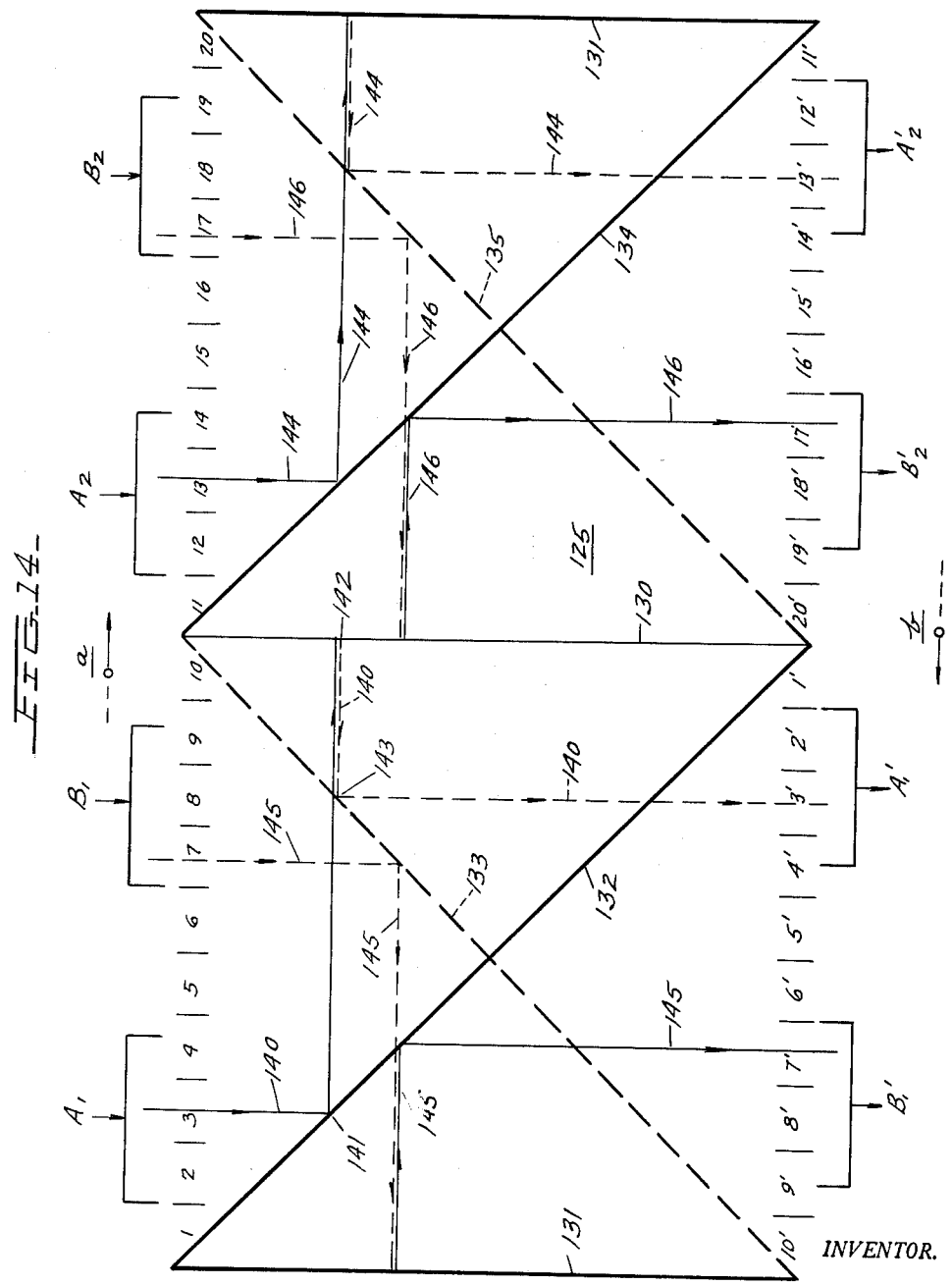

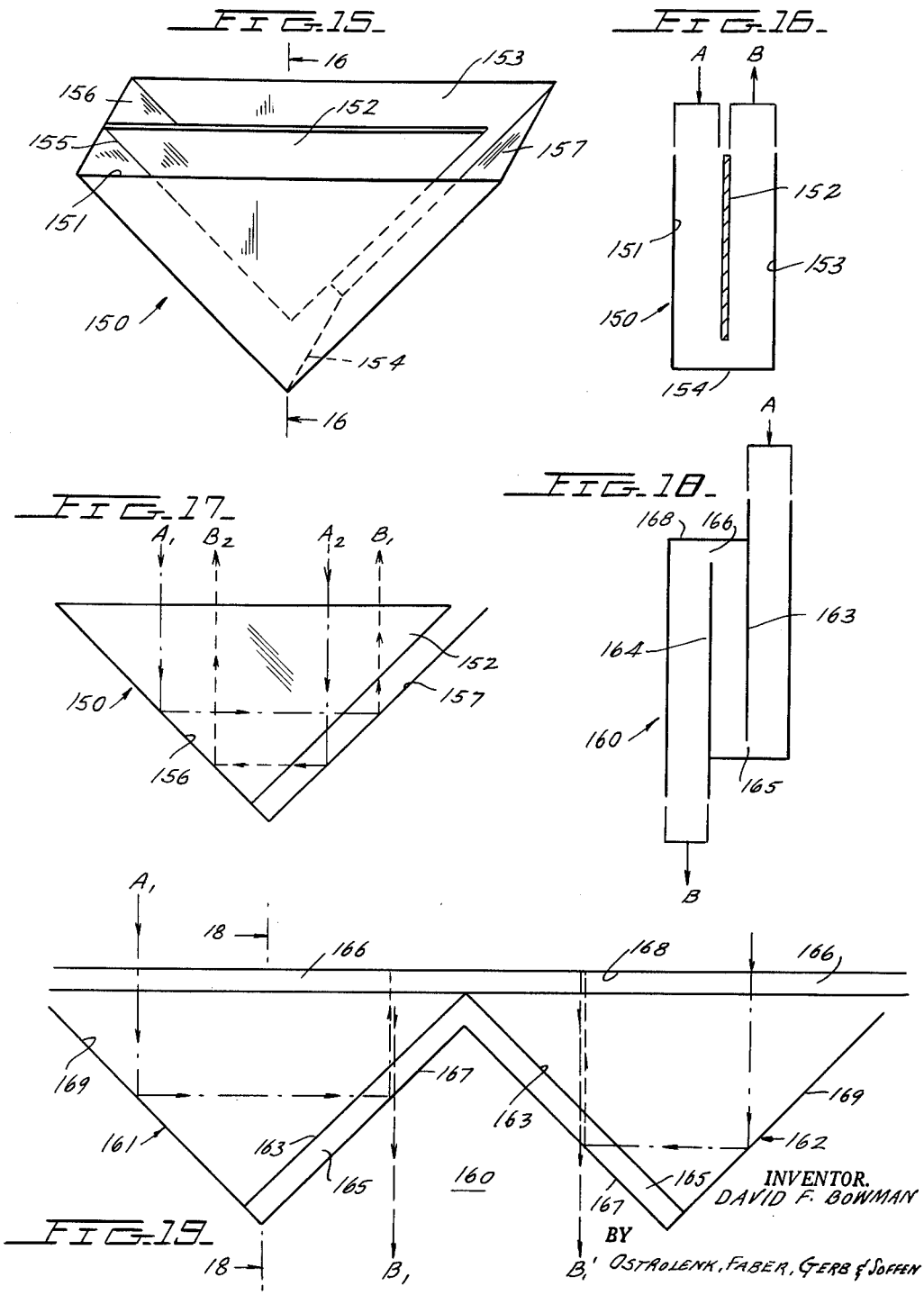

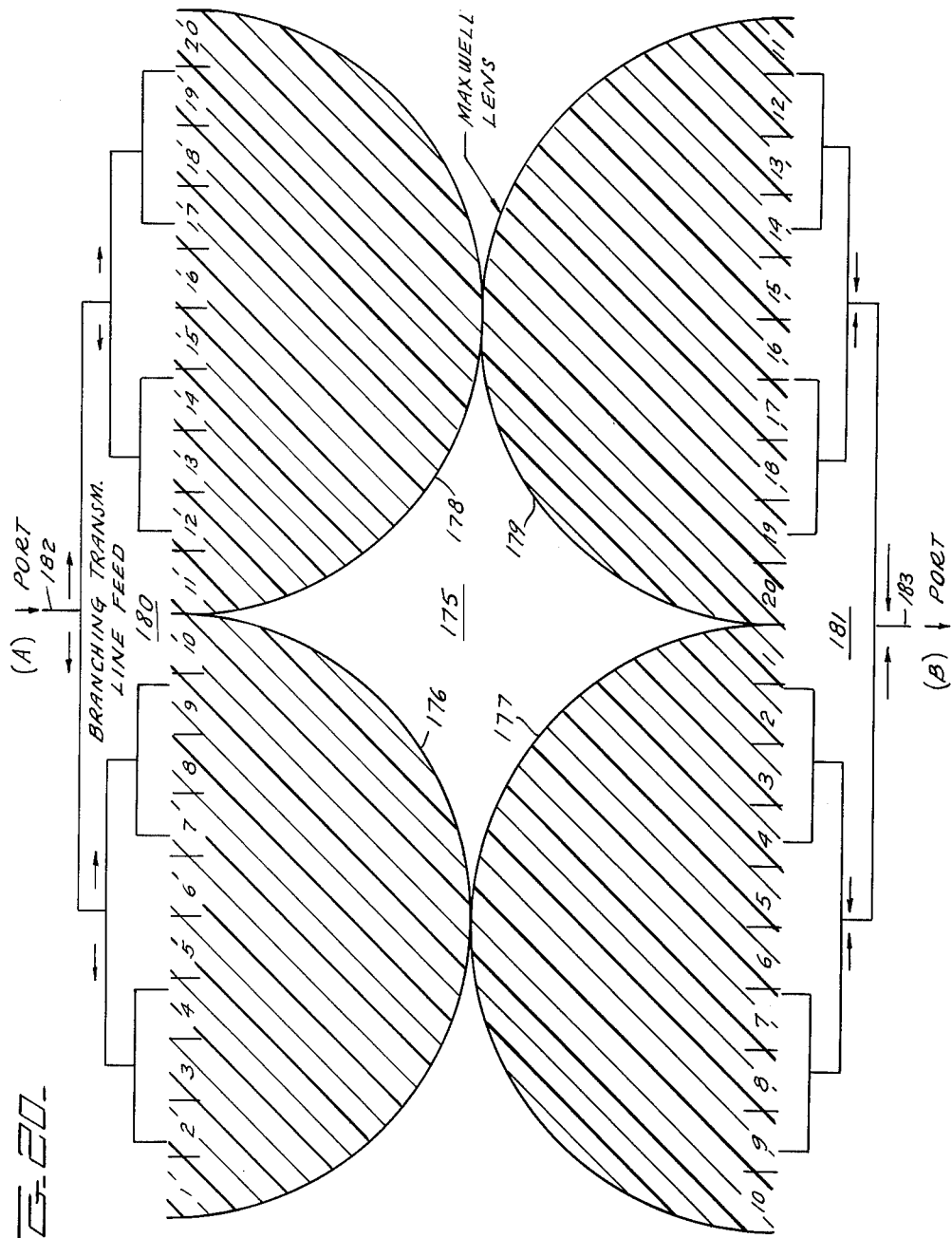

Dec. 28, 1965　　　D. F. BOWMAN　　　3,226,658
PLURAL INDEPENDENT CHANNEL CONCENTRIC ROTARY COUPLER
Filed Oct. 3, 1960　　　8 Sheets-Sheet 8

INVENTOR.
DAVID F. BOWMAN
BY
OSTROLENK, FABER, GERB & SOFFEN
ATTORNEYS

United States Patent Office 3,226,658
Patented Dec. 28, 1965

1

3,226,658
PLURAL INDEPENDENT CHANNEL CONCENTRIC
ROTARY COUPLER
David F. Bowman, Wayne, Pa., assignor to I-T-E Circuit Breaker Company, Philadelphia, Pa., a corporation of Pennsylvania
Filed Oct. 3, 1960, Ser. No. 60,025
13 Claims. (Cl. 333—1)

This case is a continuation-in-part of copending U.S. patent application Serial No. 56,496 filed on September 16, 1960, now U.S. Patent No. 3,108,235 entitled "Wave Signal Rotary Joint," and assigned to the assignee of the instant invention.

This invention relates to novel wave signal rotary joints or couplers that are capable of efficient transmission of microwave signals between an output port that is continuously rotatable with respect to its input port.

In accordance with the present invention, novel rotary joints are provided that are capable of handling higher peak and average signal power than heretofore; operable over broader bands of signals; that are readily incorporated about sizable axial structures such as the radar masts or torque tubes; and that are particularly advantageous in their capability of incorporating a number of signal channels simultaneously without interference.

The wave signal rotary joints hereof are an around-the-mast type, that overcome restrictions in existing rotary joint constructions, and provide capability of meeting difficult combinations of performance requiremnets including broad-band operation, high power utility, low SWR, low wow, and handling of three or more well isolated signal channels across the rotary joint. My invention provides rotary joints which are in microwave systems involving relative motions, particularly those with movable antennas. This includes antennas for radar, communications, radiotelescopy, etc., and in particular on antenna with a number of signal channels. However, the advantages of my novel rotary joint indicate its usefulness for single or dual channel applications.

The invention rotary joint principles are applicable, with no limitation intended, over the signal range of 300 megacycles per second to 100 kilomegacycles per second. The invention joints are useful wherever wave guides are employed and a rotary joint indicated for the system. Band width ratios of 2:1 are realizable, with losses of less than 1 db, and even as low as 0.1 db. The practical power handling capability of the invention rotary joints is of the order of to 50% of the rated power of the wave guide appropriate for the selected frequency of design. The SWR, and impedance discontinuity present no problem herein, being overcome comparably or better than in prior rotary couplers and joints.

Broadly, the rotary joint of the present invention comprises three differentially rotatable sections mountable about a central axis along which may lie a rotary member or mast. In a vertical version, the bottom and upper sections are the launching members, each arranged with separate signal launching means for each channel. The central section is generally drum-like with a hollow cylindrical type of envelope through which the mast is oriented. The central "drum" is constructed, in the manner to be hereinafter described, to conduct or direct signal energy from a series of points on one end thereof, across the drum to a corresponding series of points on the other drum end, whereby relative rotation of the drum and the contiguous launching sections effects the desired multi-channel transmission between the launching members.

Differential rotation is established between the rotary joint sections. By suitable gearing the relative phasing of multi-channel feed-through and their synchronization with corresponding launching members, is directly accomplished, as will be set forth hereinafter. Where one launching section, as the bottom one, is held stationary, the central section is rotated at half the angular rate of the top section. It is feasible to array two or more of such three-section rotary assemblies coaxially, as by axial staggering or by nesting one within the other, to provide more signal channels in addition. The present invention is thus useful as a multi-channel radio frequency including microwave rotary joint.

It is accordingly a primary object of the present invention to provide a novel wave signal rotary joint with multi-channel capability.

Another object of the present invention is to provide a novel wave signal rotary joint or coupler composed of three relatively rotatable aligned sections through which the signals are projected and synchronized as separated channels.

A further object of the present invention is to provide a novel wave signal rotary joint having a central hollow cylindrical rotatable drum type section that conducts or directs the signals between separated end launching sections.

Still another object of the present invention is to provide a novel wave signal rotary joint composed of three aligned hollow sections of cylindrical envelope that are respectively differentially mounted for synchronized multi-channel signal transmission therethrough.

Still a further object of the present invention is to provide a novel wave signal rotary joint with relatively high power handling capability, relatively broad-band operation, and relatively low SWR, or low wow.

These and further objects of the invention will become more apparent from the following description of exemplary embodiments thereof; illustrated in the drawings, in which:

FIGURE 1 is a schematic showing of a radar system incorporating a multi-channel wave signal rotary joint in accordance with the invention.

FIGURE 2 is a diagrammatic perspective representation of the wave signal rotary joint.

FIGURE 3 is a simplified illustration of the rotary joint construction and a form for its rotary drive.

FIGURE 4 is a diagrammatic illustration of the operation of the cylindrical signal translation drum embodiment of FIGURE 6.

FIGURE 5 is schematic planar representation of the signal paths and overall operation of a rotary coupler with the drum of FIGURE 6 and launchers of FIGURE 8.

FIGURE 6 is a perspective illustration of one embodiment of the central drum wave signal angular sequence reverser.

FIGURE 7 is a plan view of a concentric multiple drum array, following the basic structure of the FIGURE 6 drum.

FIGURE 8 is a perspective illustration of an exemplary launcher section useful with the drum of FIGURE 6.

FIGURE 9 is a bottom plan view of the launcher of FIGURE 8.

FIGURE 10 is a perspective illustration of a modified "parallel plate" drum section shown planar.

FIGURES 11, 12 and 13 are plan and cross-sectional views of FIGURE 10.

FIGURE 14 is a development diagram illustrating the operation of the drum section embodiment of FIGURES 10–13.

FIGURES 15 and 16 are respective views of a further drum parallel plate form which this invention may assume in practice; and FIGURE 17 is a diagrammatic representation thereof shown planar.

FIGURES 18 and 19 show another modified parallel plate type drum arrangement shown planar.

FIGURES 20 to 25 illustrate lens types of drums, in accordance with this invention.

Figure 21:
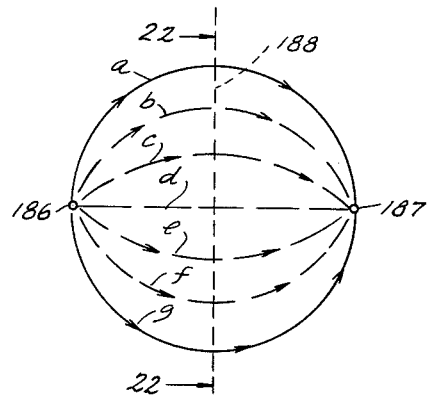
Figure 22:
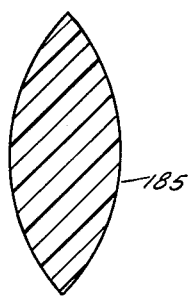

FIGURE 1 is a schematic illustration of a radar system utilizing three wave signal channels. The radar antenna 15 extends from frame 16, and is rotated by the central shaft or mast 17 through drive motor 18 and gearing 19, 20. The radar antenna unit 15 is shown connected with three signal wave guides or cables 21, 22, 23; which of course may be two or four guides, or more, depending on the type of the system. The multi-channel cables 21, 22, 23 are affixed to the rotatable superstructure being rotated with the antenna 15 on mast 17. The cables 21, 22, 23 terminate in the upper launcher section 26 of the rotary joint 25. The cables may be passed through the inside of gear 19 as illustrated so that they will not be cut off by the motor mounting.

The rotary joint 25 is shown in block form, as mounted concentrically about the mast 17, 17'; being in generally cylindrical form. The physical rotary joint 25 of this invention may assume many forms and embodiments; as will be described hereinafter. However, such various forms and combinations, for specific rotary joint purposes or advantages, basically correspond in arrangement and coaction to the diagrammatic representation 25 in FIGURE 1. The wave signal rotary joint 25 in accordance with the present invention is composed essentially of two end launcher sections 26 and 28, each operationally related with an outer region 30, 31 of central drum section 27; the drum 27 and one end launcher section 26 being rotated at a differential rate, with the other end launcher section 28 being preferably (though not necessarily) stationary.

Towards this end, the lower end launcher section 28 is secured at 32 to mast extension 17' that is stationary; and upper launcher section 26, at 33 to the rotatable mast 17. Section 26 thus is rotated by motor 18, and with the antenna 15 and multi-cables 21, 22, 23. The central drum section 27 is geared to upper and lower launching section through schematically illustrated differential gearing 35, anchored as at 34 to the interior of drum 27. The interior of the rotary joint sections 26, 27 and 28 are hollow, and they are readily designed to fit around a drive shaft or mast 17, 17'. Their electrical action per this invention is preferably arranged along the outer cylindrical region of the respective sections 26, 27, 28.

Relative rotation of the rotary joint sections 26, 27, 28 is requisite in carrying out the principles of the present invention as will be set forth. Such rotations may be effected by internal gearing as indicated in FIGURES 1 and 3, or by corresponding gearing or drives external of the rotary joint 25. FIGURE 3 illustrates in diagrammatic section an internal differential gearing array 35 and the coaxial arrangement of the rotatable active cylindrical sections 26, 27, 28 of the rotary joint 25. Upper launching section 26 is secured to a central shaft 37, a rotatable one as 17; across a web 36 secured with section 26. The lower launcher section 28 is correspondingly secured to the stationary shaft extension 37' through web 38.

The central drum section 27 is coupled to shafts 37, 37' through webs 39, 40 and ball-bearings 41, 42. The pinion 43 of differential gearing 35 is mounted on a post 44 extending from drum 27 interior, and coacts with bevelled gears 45, 46 to effect the differential drive. The exemplary requirement, as will be explained hereinafter, is for the central signal translation drum 27 to be rotated at exactly half the angular rate of the upper launcher section 26 where the lower one 28 is held stationary. Suitable proportioning of the gear drive 35 readily effects such drive relation, or any corresponding one were all three sections made movable. Other drive means, internal or external of rotary joint 25 to effect such desired operation may be employed instead, as will be understood by those skilled in the art.

With the lower end launching section 28 held stationary, the plurality of wave guides or cables connected thereto are readily integrated as shown in FIGURE 1 at 47, 48 and 49. The individual wave signals are introduced to or conducted from corresponding cables 47, 48, 49. The transmitting and/or receiving equipment or instruments are connected with the cables 47, 48, 49, at a remote location. The wave signal channels are simultaneously connected through the guides 47, 48, 49 with the lower stationary launching section 28. The multi-channel signals are then related to the adjacent drum (translator) rotatable section 27, on an end-to-end or equivalent peripheral signal coupling basis.

A significant feature of the invention system is to translate the individual channel signals on a rotational basis, with differential speeds of the joint 25 sections 26, 27, 28 effecting synchronization and channel isolation. Several practical forms for the central drum translator section 27 are illustrated and described hereinafter. The basic advantages hereof accrue from the generic arrangement of either a single or multi-channel array of end launchers with an intermediate differentially motivated translator section, to effect an efficient, clean transition across a mechanical rotary configuration.

A general description of the wave signal rotary joint is now presented, in connection with FIGURE 3, illustrating the rotary joint 50 in diagrammatic perspective view. The top or upper section 51 has a series of launching devices A, B, one for each channel desired. The devices A, B are shown as horns, but may be of other types, as will be shown. The respective launching devices A, B are each arranged to couple from a top port $a$, $b$ to a corresponding portion of the top circumference 52 (or adjacent thereto) of the central "drum" section 53. As explained in connection with top section 26 of FIGURE 1, wave guide or cable connections extend from the ports $a$, $b$ to the utilization structure 15 rotated with the top lunching section 51.

The central section 53 corresponds to the drum or hollow cylinder 27 of the rotary joint 25 (FIGURE 1). The drum or wave translation section 53 is differentially rotated with respect to top launching section 51 (and the bottom one 55), as will now be understood. The central section 53 conducts or directs the individual signal channels from one set of locations on its upper end circumference region 52 to its other end circumference region 54. Significantly, however, the location points as 1', 2', 3', . . . 11' at the region 54 are not correspondingly longitudinally opposite the points 1, 2, 3 . . . 11 of region 52. The order of the numbered points of region 54 is in the opposite rotational direction to that of region 52, and in general physically displaced angularly. Such central wave translation array 53 coupled with the differential angular rotation of the section 51, 53, 55, combine to provide the advantageous rotary joints of the invention, to be more fully described.

The bottom launching section 55 has launching devices A', B' corresponding to those of section 51. Launchers A', B', are located along the circumferential region 54 of central section 53, at similarly numbered location points to their companion launchers A, B. In this way, the isolated channel A–A', B–B', etc. are conducted across the rotary joint 50, through the central rotating translation section 53. Chokes or contacts, and/or other elements (not shown), may be provided to effect efficient coupling from the launching devices to the corresponding active circumferential regions 52, 54 of the drum 53, as will be apparent to those skilled in the art. The bottom ports *a'*, *b'* of the horns A', B', couple to corresponding wave guides to the electrical operating equipment.

The referred to U.S. Patent No. 3,108,235 utilized a plurality of successive individual wave guides mutually arranged to provide the reversed angular sequencing across the drum section. Such array is referred to as the "organ pipe" drum type. The present invention utilizes drums of simpler and less expensive constructions than the organ-pipe type. In one of its simpler forms such drum hereof comprises two concentric cylinders with longitudinal reflectors therebetween. Such linear reflectors are in effect wave signal short circuits, are positioned as at the 0° and 180° positions of the cylinder pair, as drum 60 of FIGURE 6.

FIGURE 4 diagrammatically represents the "parallel-plate" embodiment for the drum 60. Actually, one may visualize the cylindrical drum 60 embodiment, FIGURE 6, as cut along one of the reflectors 61, 62 and rolled-out in a linear developed form, to constitute FIGURE 4. While the wave signals in the actual cylindrical form are conducted in helical paths or "rays" between the spaced cylindrical surfaces 63, 64 of metallic material of good electrical surface conductivity, they are conducted in straight lines in this diagram. Their linear representation in FIGURES 4 and 5 are for simplified explanatory purposes. The spaced plane plates 63', 64' of the unit 60A of FIGURE 4 correspond to the surfaces of spaced concentric cylinder 63, 64 of the drum 60 of FIGURE 6; and reflector plate 62' to plate 62. The end plates 61', 61" of unit 60A correspond to the single plate 61.

An essential function of the drum 60 is to establish the referred reversed angular sequency of incident beams or rays at one end as they traverse the drum to its other end. The launching sections are arranged to fire at an inclination to the longitudinal direction between the plates 63, 64 (63', 64'). A practical firing angle is of the order of 45° in this embodiment.

The upper launching section 65 is composed of four equispaced horns 66, 67, 68, 69, inclined at about 45° to the drum interspace paths below them. The corresponding lower launching section 70 is composed of the spaced horns 66', 67', 68', 69' in an altered sequence to be explained. It is understood that the drum 60 and the respective launching sections 65 and 70 are respectively in angular movement in accordance with the basic principles set forth hereinabove in connection with FIGURES 1, 2 and 3; that drum 60 corresponds to drum 25; and launching sections 65, 70, to 26, 28.

In the "parallel-plate" drum embodiment 60 (60A) the opposed wall regions 63, 64 (63', 64') constitute an effective transmission line region common to all the launching firing elements, and provides a through channel between launching sections 65 and 70. The exemplary drum 60 (60A) utilizes two reflectors 61, 62 at 180° separation, for practical dimensional advantage.

The wave signal paths between the launching sections and in the drum are indicated for simplicity as "ray" paths. Thus the beam or ray 76 from inclined horn 66 penetrates the top plane of the parallel plate array at region 71, is reflected at point 62A of reflector 62, and emerges at region 71' at the bottom plane across plates 60 (60A). Similarly, rays 77, 78, 79 from horns 67, 68, 69 are reflected by plates 61, 62 and pass into horns 67', 68', 69'. The regions 71, 72, 73 74 of top launcher horns 66, 67, 68, 69 are in the top commutating plane between drum 60 and launching section 65; the lower regions 71', 72', 73', 74', in the bottom commutating plane for launching section 70.

The respective horn elements are orientated complementarily to coact with their companion elements in respective pairs: 66, 66'; 67, 67'; 68, 68'; and 69, 69'. Their reversed (angular) sequencing is due to the ray reflections on the reflectors 61, 62 at points 61a, 61b and 62, 62b respectively as will now be understood. Their motivation in opposite relative directions, as described hereinabove, and also as utilized in the organ pipe drum systems of the aforesaid patent applications, results in the rotary coupling transmission of synchronous characteristics.

In view of the open space transmission along the drum 60 interplanar region 63–64, only one channel is practical per "layer" or "two-plane line" in such constructions hereof for avoiding interchannel interference or "cross talk." Also, although the respective horn or firing elements are illustrated in parallel array for sections 65 and 70, it is feasible to cross the angular paths thereof in any one section, as only a common channel wave signal per section is indicated. In such event, a corresponding orientation is provided in the resequenced launching element array at the opposite end. While four horn elements per section (65, 70) are illustrated, more or fewer may be employed.

Horns 66, 67, 68, 69 may be of separate channels, however the interchannel coupling will be high in this case. Horns for different channels need not be parallel-firing, may instead fire at equal but opposite angles from vertical. If more complete interchannel isolation is required then one set of parallel plates must be provided for each channel and each channel may include more than one horn (at each end) all horns at any one end firing at parallel directions (in the developed view.) Also, the launching elements may differ from the horn configuration, as will be understood by those skilled in the art. To increase the number of channels of transmission across a particular rotary coupler hereof, a corresponding number of concentric "layers" or "parallel-plate" transmission lines are added to the basic unit 60 or FIGURE 6.

The drum section 80 of FIGURE 7 is constructed for two isolated independent channels A and B, and comprises three spaced concentric conductive cylinders 81, 82, 83. The inner transmission channel A is composed of the opposed surfaces of cylinders 81, 82 and the 180° spaced longitudinal reflector plates 84, 85; and corresponds identically to the drum 60 of FIGURE 6. The commutating plane regions 91, 92, 93, 94 are similar to those of drum 60, namely 71, 72, 73, 74, across which angularly fired wave signals traverse. The outer channel B is composed of the outer surface of cylinder 82 coacting with the spaced inner surface of cylinder 83, and the two reflectors 86, 87. The corresponding commutating plane firing regions are indicated at 95, 96, 97, 98.

The "commutating planes" are also the planes at which one member, e.g. the drum, is directly adjacent to another member, e.g. a launcher, and relative shearing or sliding motion occurs as it does between the commutator segments of a direct-current machine and a carbon brush. Of course, actual sliding contact is not required in my invention since I provide chokes or other means for maintaining the current paths. The commutating planes of FIGURES 4 and 6, for example, are the top and bottom surfaces.

Companion commutation plane regions for channels A and B are arrayed at the opposite end of drum 80, for the companion launcher elements, as will be understood by those skilled in the art. Also, as stated, the four launching elements (and regions) per channel is merely an exemplary number. Also, for more independent channels, corresponding spaced concentric cylinders are added with reflector plates; and similarly a ring of launching elements for each new transmission "layer" is added to each end launching section for coaction therewith at mating inclined firing angles as set forth hereinabove.

FIGURE 5 is a developed diagram of a transmission channel with a "parallel-plate" configuration as per drums 60 and 80. FIGURE 5 however, illustrates the coaction of the plurality of beams or ray paths in a modified rotary coupler, namely, one with a central translation drum 100 similar to that of drum 60, but utilizing novel traveling wave slotted array launching sections 101, 102 at each drum commutating end. It is understood that the FIGURE 5 diagram represents a rotary wave signal coupler, with a drum 100 configuration that is cylindrical with two spaced cylinders as the drum 60 form, with two longitudinal reflector plates at the 0° and 180° positions between the effective cylindrical transmission line. The longitudinal reflector plate of drum 100 are shown at 103 and 104, 104' (with the "plates" 104, 104' actually being a single plate in the drum).

The "ray" paths 115, 116, 117, 118 are indicative of the singly reflected and angularly reversed sequence effected by the reflectors 103, 104 between the slotted launchers 101, 102. The ray paths 115, 116, 117, 118 are all of identical lengths as the full signal or wave guide or transmission paths from any one launcher slot and adjacent drum region to the mating one on the opposite drum commutating plane, as will be set forth in more detail hereinafter, to effect the homogeneous channel transmission between the launchers 101 and 102.

The annular launching sections 101 and 102 are of identical physical construction, but space phased apart for the reversed ray sequence coaction. This "space phase" (angle) changes with rotation, of course. FIGURES 8 and 9 illustrate one form which launchers 101, 102 may assume in practice. Its toroidal form has a plane 105 for the commutating regions with drum 100. Plane 105 contains equi-spaced slots 106 preferably to match with an equal number of entry regions indicated at positions 1, 2, 3 . . . 20 in FIGURE 5. The entry regions 1, 2, 3 need not necessarily be physically divided by walls. The transverse sectional shape and dimension of the launcher 101 (and 102) is proportioned for efficient transmission of the channel wave length the range for which it is indicated. The preferred wave signal is the $TE_{10}$ mode in the direction along the slotted arrays 101, 102. The launchers 101, 102 then are of usual wave guide cross-sectional dimensional ratio, as 2:1; with the shorter dimension being the radial one, perpendicular to the direction along the slots 106 (see FIGURE 9). Other modes, cross-sections and slot arrangements, are feasible, such as having equi-spaced openings 106 as circular holes.

The travelling wave slotted array launchers 101 and 102 have their respective input (or output) ports at 111, 111'. The arrays 101, 102 are symmetrical. Right- and left-handed arrays are required. The transmission of the wave signals may be in either direction between them, and across the central drum 100 (of FIGURE 5). Each travelling wave array 101, 102 extends along the whole annular commutation region of each drum 100 end, and has a suitably matched termination wall indicated at 113, 113' juxtaposed with a wall of the associated input port 110, 110'. The notch 112, 112' is due to the 45° wall at the port region for directing the travelling waves with respect to the perpendicular port regions 111, 111'. Physical design factors to establish optimum travelling wave configuration in the launchers 101, 102 will now be evident to those skilled in the art. The launchers 101, 102 give directional non-spreading wave to signal "beams" 115–118 that fill the annular drum transmission region at 360°.

The plane developed diagram, FIGURE 5, represents the two annular launchers 101, 102 arranged to obliquely fire between the concentric signal transmission surfaces of drum 100 through its end regions denoted at 1, 2, 3, . . . 20 and 1', 2', 3', . . . 20' respectively.

The travelling wave arrays 101, 102 inherently fire obliquely through their respective slots 106, 106'; and are proportioned to fire at 45° in the exemplary form, as indicated by their ray paths 115, 116, 117, 118. While the direction of the wave signal movement, as indicated by the arrows, is from upper launcher 101, downwardly through drum 100, and into and through lower launcher 102, it is understood that the reverse direction is equally feasible due to the symmetry hereof. While the series of transverse plates 120, 120' at the drum 100 commutation end regions are illustrated, their presence is optional. The entry regions are in a certain spaced phased relationship but this is a property of the drum (and the numbering of the entry region) alone. The launchers take on all possible (mechanical) phase relationships as the joint is rotated.

As is now apparent from the indicated ray paths 115, 116, 117, 118 in FIGURE 5, all the obliquely fired wave signal "rays" or "beams" from the respective slots 106, 106' (in either direction) are of equal length. Such factor is very significant to maintain the integrity of the transmitted wave signals across the rotary joint between the respective ports 110, 110'. The preferred mode of transmission is polarized perpendicular to the surface of the concentric transmission layer that is formed by the "parallel-plates." This is accomplished by the $TE_{10}$ mode referred to hereinabove. The "parallel-plate" transmission line characteristic is accomplished between opposed curved surfaces having a radius of curvature large with respect to their spacing. The cylindrical "parallel-plate" type drum sections 60 and 80 of FIGURES 6 and 7 merely indicate such form factor. The use of two reflectors 103, 104 at the 0° and 180° drum positions rather than a single one at, say, 0° results in a shorter total ray path length which is desirable.

A modified common-path type of drum section is illustrated in perspective in linear form in FIGURES 10 to 13. The "drum" 125 is understood to be in the cylindrical form as indicated at 25 in FIGURES 1 and 2; the developed form of FIGURES 10–13 being used for clarity of presentation, and is related to the "plane" ray path representation of FIGURE 14 thereof. The wave passage of unit 125 is formed by three planes, and comprises two layers or transmission paths. The outer planes are two plates 126, 127 uniformly spaced. The central plane is composed of plates 128 and 129 equidistant (and parallel) to each of plates 126 and 127.

Two reflectors 130 and 131 (131') extend between plates 126, 127, being normal thereto for the reflection function to be described. Reflectors 131, 131' are the opposite faces of a single vertical reflector in the practical cylindrical form referred to, and as used. The central plates 128, 129 do not extend to the vertical reflector plates 130, 131, forming 90° transmission bends for the ray paths between the layers as will be set forth. The sections between 131' to 130 and 130 to 131 are identical, being duplicated to correspondingly reduce the ray path lengths. A set of two crossed, oppositely oriented, 45° reflectors 132, 133 and 134, 135 are arranged in each section for the overall ray path configuration illustrated and now described in connection with FIGURE 14.

In the FIGURE 14 diagram of the ray path disposition of the unit 125, the parallel plates 126, 127, 128 and 129 are in the plane of the sheet, with the vertical and 45° reflectors indicated by like numerals with FIGURES 10–13. It is understood that "elevational view" diagram FIGURE 14 has two layers, the rear layer reflectors 133 and 135 being drawn in dashed lines. The launchers at each commutating end of central unit 125 are arranged for two isolated channel operation: Elements (A and B) schematically indicate the launchers. Each launcher actually extends around the complete periphery of the drum although only portions or elements $A_1$, $A_2$, etc. are shown. Elements $A_1$ and $A_2$ are in the forward layer, initially impinging on 45° reflectors 132 and 134 respectively; elements $B_1$ and $B_2$, in the rear layer, initially impinging on 45° reflectors 133 and 135 (see also FIGURE 10).

The drum entry positions 1, 2, 3 . . . 20 and 1', 2', 3' . . . 20' are arbitrarily along the commutation planes: The launching firing is normal to the end of the "drum" 125. The launching elements (A, B) may be horns, part of a branching feed system, traveling wave slotted arrays, or equivalent. The ray path 140 from element $A_1$ initially impinges on 45° reflector 132 at region 141 and is reflected horizontally to vertical reflector 130, at region 142 thereof. The ray then executes a 180° turn at region 142 into the opposite layer, and proceeds to 45° reflector 133. After impinging at region 143 of reflector 133 (see also FIGURE 10), the ray emerges through "drum" 125 into launcher element A: Ray path 140 consists of an odd number (three) reflections in unit 125.

The positions on the drum launcher ends are in reversed angular sequence; the ray 140 emerging at position 3', corresponding to its incident position 3 at the other drum end. Similarly, incident ray path 144 from element $A_2$ is reflected successively by reflectors 134, 131 and 135 to emerge at corresponding element $A_2'$. Launcher elements $A_1$ and $A_2$ are on one channel and layer position (the forward one, see FIGURE 10), while corresponding "mating" elements $A_1'$ and $A_2'$ are for the same channel, the "A" channel, but are disposed on the opposite side and opposite layer, as will now be understood. The respective end launchers are rotated at opposite relative directions as indicated by arrows $a$ and $b$.

The "B" channel comprises incident launcher elements $B_1$ and $B_2$ on the far layer, with coacting elements $B_1'$, $B_2'$ reversed sequence. The ray paths 145, 146 therebetween are of similar form and length to beams 141, 144, bending between two layers. The result is two well-isolated communication channels "A" and "B" across the "drum" section 125. It is to be understood that more launching elements may be used for each channel, as already indicated. The developed unit 125 is actually cylindrical. The change-of-layer reflections accordingly occurs along a cylinder element, and invariably at the mid-point of all the rays. Thus, it is practical to construct such drums with efficient transmission; little residual reflections; for relatively large band width and close matching; and with a minimum of wow due to reflection. Also, the exemplary reflectors may be set at other angles at the expense of ray length and efficiency.

FIGURES 15 and 16 represent diagrammatically a modified parallel-plate unit 150, in linear form. One section is illustrated, but two end-to-end may be utilized, and in the cylindrical form, as stated in connection with units 60 and 125 hereinabove. Unit 150 comprises two layers formed by three parallel metallic wall sections 151, 152, 153, each in an angular form, at 45° in the illustrated embodiment. The outer apex 154 is at the selected angular (45°) form. The central wall or plate 152 is contiguous at one edge 155 with a transverse reflector element 156; and is clear of a similar transverse reflector element 157 at the opposite side.

The open space between the central plate 152 and reflector 157 constitutes a region of layer transfer as well as reflection for rays incident upon reflector 157, in the manner of unit 125. The end launchers comprise one or more spaced horns, or equivalent, over each ray path layer of unit 150, as indicated at A and B in FIGURE 16. The end launchers in this form are all on one side of the rotatable "drum" incorporating one or more angular sequence reversing units 150. Also there is no interference between the input and output horns.

Reference to the diagram of FIGURE 17 illustrates the ray path course and sequence reversing action of unit 150. Rays $A_1$ and $A_2$ on the A channel side are each reflected once each by the transverse reflectors 156, 157, and transposed to the B layer as well. It is noted that the respective $A_1$ and $A_2$ ray paths are of equal length, as are all the others across unit 150. Further, the space sequence of the $A_1$, $A_2$ input, emerges in opposite sequence at in the $B_1$, $B_2$ direction over the B channel. The end launcher containing the "A" horn set for rays $A_1$, $A_2$ are rotated about "drum" 150 in the opposite angular direction to that of the "B" horn set; or one of them is held stationary, as already set forth.

A further form of drum unit containing "parallel plate" transmission system configuration is illustrated at 160 in FIGURES 18 and 19. Unit 160 is shown in two contiguous section 161, 162, each a three-layer array formed with four "parallel plates." The cylindrical final form is understood, FIGURE 19 being essentially diagrammatic. The three layers hereof in essence add a second central change of layer plate, to further reverse the course of the incident rays. The input and output horns or launchers are thus on opposite ends of the "drum" 160, and, of course, well isolated against signal interference. The two corner reflector sections 161, 162 are used to minimize ray length.

Each section (161, 162) contains two intermediate 45° plates 163, 164 (see FIGURE 18) with corresponding spaces 165, 166 for change of layer bending. The 45° transverse reflectors are shown at 167 and 169, and the end transverse reflectors at 168 at space 166. The course of rays $A_1$, and $A_1'$ (see FIGURE 19) is similar to those of FIGURE 17, except three reflections take place in sections 161, 162. The rays emerge on the opposite end $B_1$, $B_1'$, in the requisite reversed sequence.

FIGURE 20 is a developed view, in cross-section through a lens-type of common path drum 175 to effect angular sequence reversal of rays between launched incident and emergent signal wave channels. Drum 175 is understood to be in cylindrical form; contain two sets of semi-circular Maxwell or equivalent dielectric lens 176, 177 and 178, 179; and have parallel metallic side plates (as 63, 64 of drum 60, FIGURE 6) to contain the wave signals. The end launchers 180, 181 are of any suitable normal firing type. The launchers 180, 181 illustrated, are of the binary type, branching transmission line feed normal firing array. The respective ports 182, 183 represent one through channel. Other concentric lens-type layers and the launchers therefor may be concentrically arranged for multi-channel operation.

Figure 23:
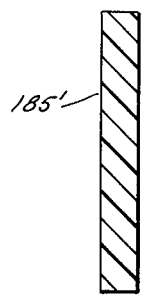

FIGURES 21 and 23 illustrate the principle of sequence reversal effected by each lens pair 176, 177 and 178, 179 across drum 175. The conventional Maxwell lens, is shown at 185 in FIGURE 21 with a circular face; and in cross-sectional FIGURE 23. The material is dielectric and with a dielectric constant configuration well known in the art. Maxwell lens 185 inverts a signal wave image between an incident region 186 and output 187. This is accomplished through the ray path distribution $a, b \ldots g$ illustrated in FIGURE 21.

Figure 24:
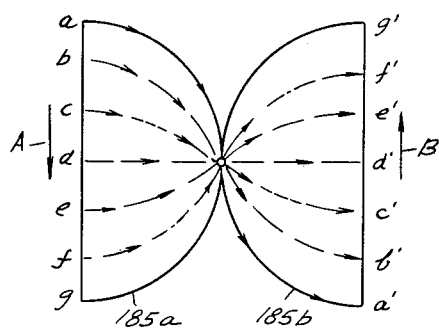

The tangent (at 189) semi-circular lenses 185$a$, 185$b$ of FIGURE 24 is formed by slicing the Maxwell lens 185 along a diameter, as 188. The incident ray sequence $a$, $b$, . . . $g$ is reversed therethrough from the A side at face 188$a$ to the B side at face 188$b$. The resultant sequence is in the opposite angular direction, as is requisite in a drum configuration as $a'$, $b' \ldots g'$. The tangent lens set 176, 177 and 178, 179 of drum 175 (FIGURE 20) correspond to the semi-circular Maxwell-type lenses 185$a$, 185$b$ of FIGURE 24.

Figure 25:
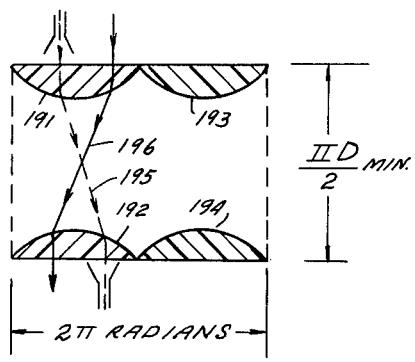

FIGURE 25 illustrates a modified lens-type drum 190 (developed). Drum 190 is composed of two sets of spaced plano-convex lenses 191, 192 and 193, 194. Their ray transposition action is indicated by rays 195, 196. The launching is by normal firing. The lenses used in the lens type of drums 175 and 190 are of the dielectric type, as stated, artificial dielectric, or for parallel polarization may utilize waveguide phase length variation with spacing.

The dielectric lens drum types are limited in their signal power handing capability as compared to the open spaced parallel plate forms. They however are comparatively inexpensive to construct, and are useful for low power transmitter operation, and for receivers. A particular advantage is the relative shortness of the drum ray paths and therefore of the launcher or horn separation. The axial drum length of the 175 and 190 lens types is $\pi D \div 2$ or greater, where D is the drum diameter.

Figure 26:
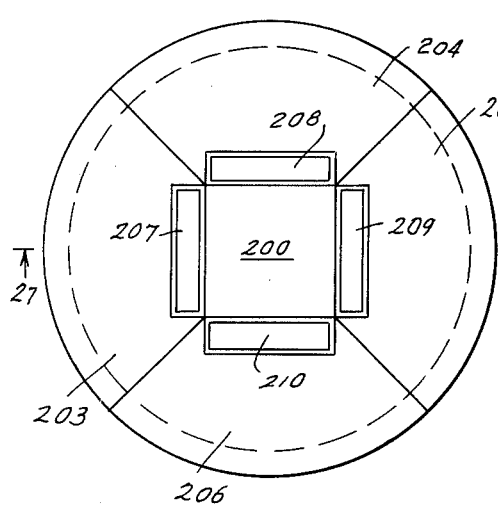
FIGURES 26 and 27 are respective plan and sectional views of a plural horn launcher array for normal firing drum configurations.
Figure 27:
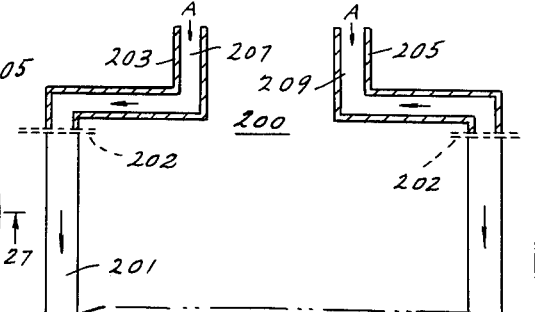

FIGURES 26 and 27 illustrate in respective plan and cross-sectional views a group of radial feed horns 200 as an end launching section for a cylindrical drum 201. The coupling between launcher and drum 201 is across the commutation planes 202. The horn array 200 is a normal firing arrangement, as indicated in FIGURE 27, and the drum 201 used therewith is of corresponding action. The parallel plate layer type of drum 201 is understood. The radial horns 203, 204, 205, 206 nest together in radial disposition from their input ports 207, 208, 209, 210. The plane signal waves A radiate uniformly along the radial wave guides thereof to the peripheral commutation region 202, coupling thereat to drum 201. The horn 200 array may be flat and compact as illustrated.

Although the present invention has been set forth with exemplary embodiments, it is to be understood that variations and modifications as to the forms, arrangements and applications it may assume in practice will present themselves to those skilled in the art, and that it is not intended to be limited except as set forth in the following claims.

I claim:

1. A rotary wave signal coupler comprising at least a first and a second launching section, and a rotary section; said rotary section having input and output ends for coupling wave signals between said first and second launching sections, while said sections are in relative rotary motion; said rotary section composed of a first and a second cylindrical conductive surface in substantially uniform spaced relation, and a reflector means positioned between said conductive surfaces and extending transverse to said surfaces; said rotary section defining passage means, said transverse reflector means positioned in oblique relationship with respect to said launching sections, such that said reflector means directs the wave signals between the spaced surfaces in a predetermined manner, such that the wave signals are directed between said input and output ends.

2. A rotary wave signal coupler comprising at least a first and a second launching section, and a rotary section; said rotary section having input and output ends for coupling wave signals between said first and second launching sections, while said sections are in relative rotary motion; said rotary drum section composed of a first and a second cylindrical conductive surface in substantially uniform spaced relation, and a reflector means positioned between said conductive surfaces and extending transverse to said surfaces; said rotary section defining passage means, said transverse reflector means positioned in oblique relationship with respect to said launching sections, such that said reflector means directs the wave signals obliquely between the spaced surfaces in a predetermined manner, such that the wave signals are directed between said input and output ends in reversed angular sequence.

3. A rotary wave signal coupler as claimed in claim 1 in which said surfaces are spaced concentric cylinders forming a drum section.

4. A rotary wave signal coupler as claimed in claim 2 in which said surfaces are spaced concentric cylinders forming a drum section.

5. A wave signal rotary coupler as claimed in claim 1, further including a central plate spaced edgewise from said transverse reflector means, and lateral reflectors to effect wave signal sequence reversal between said input and output ends.

6. A wave signal rotary coupler as claimed in claim 1, further including a central plate spaced edgewise from said transverse reflector means for forming change-of-layer bend regions at each longitudinal edge of the central plate, and lateral reflectors arrayed in inclined relation to the end signal input and output directions of the drum to effect wave signal sequence reversal between said input and output ends.

7. A wave signal rotary coupler as claimed in claim 1, wherein said transverse reflector means includes elements inclined to each other, a central plate juxtaposed along one longitudinal edge with one of the transverse elements and spaced from another reflector element along the other longitudinal edge to form a change-of-layer bend region at the spaced edge, said layers and reflector elements effecting wave signal sequence reversal between the adjacent layers.

8. A wave signal rotary coupler comprising at least a first and a second launching section and a rotary section; said rotary section having input and output ends for coupling wave signals between said first and second launching sections, while said sections are in relative rotary motion; said rotary section including a pair of semi-circular lenses of dielectric material for defining wave signal passages effecting sequence reversal between the incident and emergent wave signals at said input and output ends of said rotary coupler.

9. A wave signal rotary coupler comprising at least a first and a second launching section and a rotary section; said rotary section having input and output ends for coupling wave signals between said first and second launching sections, while said sections are in relative rotary motion; said rotary section including a pair of lenses of dielectric material for defining wave signal passages effecting angular sequence reversal between the incident and emergent wave signals at said input and output ends of said rotary coupler.

10. A wave signal rotary coupler comprising at least a first and a second launching section and a rotary section; said rotary section having input and output ends for coupling wave signals between said first and second launching sections, while said sections are in relative rotary motion; said rotary section including a pair of Maxwell-type of lenses of dielectric material tangent at their facing edges for defining wave signal passages effecting angular sequence reversal between the incident and emergent wave signals at said input and output ends of said rotary coupler.

11. A wave signal rotary coupler as claimed in claim 8, in which said lenses are of plano-convex configuration in spaced array.

12. A wave signal coupler, comprising in combination, at least a first and a second launching section, and a rotary section; said rotary section having input and output ends for coupling wave signals between said first and second launching sections, while said sections are in relative rotary motion; said launching sections oblique to said rotary section; said launching sections comprising an annular wave guide having a series of slots along a circumferential surface thereof space-separated in the manner of a traveling wave array, said slots operatively positioned to obliquely couple with cooperating passage means of said rotary section.

13. A wave signal coupler, comprising in combination, at least a first and a second launching section, and a rotary section; said rotary section having input and output ends for coupling wave signals between said first and second launching sections, while said sections are in relative rotary motion; said launching sections oblique to said rotary section; said launching sections comprising an annular wave guide having a port for external signal coupling and a series of equi-spaced radial slots along a circumferential surface thereof space-separated in the manner of a traveling wave array, said slots operatively positioned to obliquely couple with cooperating passage means of said rotary section.

(References on following page)

References Cited by the Examiner

UNITED STATES PATENTS

| | | | |
|---|---|---|---|
| 2,523,348 | 9/1950 | White et al. | 333—98 |
| 2,737,633 | 3/1956 | Tomiyasu | 333—98 |
| 2,942,262 | 6/1960 | Shanks et al. | 343—771 |
| 2,945,193 | 7/1960 | Strom | 333—98 |
| 2,947,955 | 8/1960 | Bellemy et al. | 333—98 |
| 2,975,382 | 3/1961 | Fromm et al. | 333—98 |

OTHER REFERENCES

Southworth: Principles and Applications of Waveguide Transmission, Van Nostrand Co., Inc., copyright 1950, page 175 relied on.

HERMAN KARL SAALBACH, *Primary Examiner.*

BENNETT G. MILLER, ELI LIEBERMAN, *Examiners.*